(No Model.)

J. H. REYNOLDS & C. H. SHAW.
Faucet Bung.

No. 235,653. Patented Dec. 21, 1880.

Witnesses:
Henry J. Poyle
Edwin G. Day

Inventors:
J. H. Reynolds
and
C. H. Shaw,
by
William H. Low,
Attorney

UNITED STATES PATENT OFFICE.

JOHN H. REYNOLDS AND CHARLES H. SHAW, OF TROY, NEW YORK.

FAUCET-BUNG.

SPECIFICATION forming part of Letters Patent No. 235,653, dated December 21, 1880.

Application filed September 17, 1880. (No model.)

*To all whom it may concern:*

Be it known that we, JOHN H. REYNOLDS and CHARLES H. SHAW, both of Troy, in the county of Rensselaer and State of New York, have invented certain new and useful Improvements in Faucet-Bungs for the Heads of Beer-Kegs, Barrels, &c., of which the following is a full and exact description.

Our invention consists in combining a metallic bushing adapted to fasten in the head of a keg, barrel, &c., and provided near its inner end with an enlargement and a flange, as hereinafter set forth, with an annular wooden sleeve, which forms a semi-elastic seat for receiving the faucet, and a separate plug of wood or metal as a stopper for the opening in the sleeve before the faucet is inserted therein.

Figure 1:
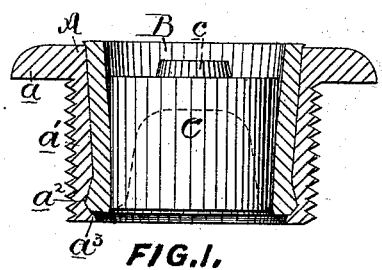
Figure 2:
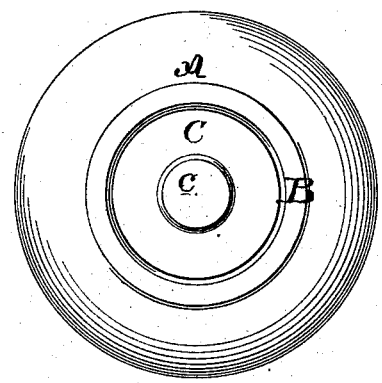

In the accompanying drawings, which form a part of this specification, and to which reference is herein made, Figure 1 is a longitudinal section of the metallic bushing and wooden sleeve, with the central plug shown in elevation; and Fig. 2, a plan view of the same.

As shown in the drawings, A is the metallic bushing, provided with a flat projecting flange, $a$, which extends over onto the head of the keg, into which the bushing is permanently fastened. The bushing part $a'$ has the general shape of a coniform sleeve, of slight taper on its inner and outer sides, and it has on its exterior surface a screw-thread, by which the bushing is secured in the head of the keg. In the bore of said bushing, near its lower end, an enlargement, $a^2$, is formed, which is followed by a contraction, whereby the flange $a^3$ is produced, whose inner diameter is slightly less than the taper bore extended to that point.

The wooden sleeve B is made of soft wood, with its grain running lengthwise of the sleeve. It is tapering in form and a little larger in diameter than the bore of the metallic bushing, so that when driven into the bushing the fibers of the wood will be so compressed that the pores thereof will be closed to prevent the escape of the gases from the beer contained in the keg, and when the lower end of the sleeve enters the enlargement of the bore of the bushing the fibers will again expand to hold the sleeve securely in place.

The plug C may be made of wood or metal, preferably of iron. It should be of less taper than the bore of the sleeve B, in which it is driven, so that when in place it will aid in expanding the lower end of the sleeve to fill the enlargement $a^2$ of the bushing. Its upper end lies on a lower plane than that of the bushing, and is provided with a small protuberance, $c$, for entering the bore of the faucet, to guide it (the faucet) while being driven in, so that it will not damage the sleeve B.

The bushing A is first permanently secured in the head of the keg; then the sleeve B is forcibly inserted therein, and after the vessel is filled the plug C is driven into the sleeve as a temporary stopper. When a faucet is to be inserted in the keg the bore at its inner end is placed over the protuberance $c$ on the plug to keep the end of the faucet clear from the sleeve, and then a few vigorous blows of a mallet on the outer end of the faucet will drive the plug C inside the keg and fasten the faucet in the sleeve B. Said sleeve forms a packing of sufficient elasticity and tenacity (even when used in the head of a keg without the bushing) that it will hold the faucet securely, but will permit its removal without injury to the keg.

By this improvement we remedy a serious difficulty that exists where faucets are used in the customary way in the heads of beer-kegs, occasioned by an elongated enlargement of the hole in the head from striking the faucet sidewise preparatory to its removal, whereby the hole, after a little use, becomes so misshaped that the faucet will not fill it, and a leakage results therefrom.

Metallic bushings have heretofore been constructed with screw-threads formed in their bore for receiving a wooden sleeve provided with a corresponding screw-thread on its exterior surface, and the two are held together by means of said threads; but in that mode of construction no compression of the fibers of the wood is produced by inserting the sleeve into the bushing, and when the grain of the wood runs lengthwise of the sleeve the pores will remain open and permit the fixed air and gases from the beer to escape thereout. Conical plugs for receiving faucets have also been made with a chamber near their outer end for holding a tubular bushing of rubber, leather, or other elastic material as a packing for the stem of the faucet, and an enlargement in the inner end for containing a cork; but in that construction the elastic sleeve did not extend back into the enlargement formed for the cork, nor did the cork come into contact with the elastic sleeve. The difference between these earlier devices and ours is manifest.

We claim as our invention—

1. The combination, with the metallic bushing A, provided with the enlargement $a^2$ and internal flange, $a^3$, as herein set forth, of the wooden sleeve B, having a greater diameter than the bore of the bushing, into which it is driven to compress the fibers and close the pores of its wood, and having its inner end formed to extend into the enlargement $a^2$, as described, and the separate plug C, adapted to drive into and to form a stopper for the wooden sleeve B, as and for the purpose herein specified.

2. The combination of the metallic bushing A, provided with the enlargement $a^2$ and internal flange, $a^3$, with the wooden sleeve B, having a greater diameter than the bore of said bushing, wherein it is driven to compress the fibers and close the pores of its wood, as herein set forth, and having its inner end formed to extend into the enlargement $a^2$ of the bushing, as and for the purpose herein specified.

JOHN H. REYNOLDS.
CHARLES H. SHAW.

Witnesses:
JOHN L. SHIRLEY,
JOHN SHIRLEY.